(12) United States Patent
Hanlon

(10) Patent No.: US 8,967,458 B1
(45) Date of Patent: Mar. 3, 2015

(54) MESSAGES ASSOCIATED WITH UNOPENED DELIVERED PACKAGES

(75) Inventor: Jon T. Hanlon, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 113 days.

(21) Appl. No.: 13/600,022

(22) Filed: Aug. 30, 2012

(51) Int. Cl.
*G06F 17/00* (2006.01)

(52) U.S. Cl.
USPC .......................................... 235/375; 235/385

(58) Field of Classification Search
USPC ..................... 235/375, 380, 462, 462.01, 385
See application file for complete search history.

(56) References Cited

U.S. PATENT DOCUMENTS

| | | | |
|---|---|---|---|
| 6,859,722 B2 * | 2/2005 | Jones | 701/465 |
| 7,062,474 B1 * | 6/2006 | Reiter | 705/408 |
| 7,844,481 B2 * | 11/2010 | Hilbush et al. | 705/7.13 |
| 2013/0018726 A1 * | 1/2013 | Ionescu et al. | 705/14.49 |

* cited by examiner

*Primary Examiner* — Daniel St Cyr
(74) *Attorney, Agent, or Firm* — Lee & Hayes, PLLC

(57) ABSTRACT

This disclosure is directed at least in part to providing coded messages associated with unopened delivered packages. The coded messages may help recipients determine information about the contents of packages without opening the packages, and thereby help prevent spoiling surprises (e.g., holiday gifts, etc.) or otherwise preventing other unwanted behavior. In some embodiments, the coded messages may be decrypted or otherwise received by an authorized recipient of the package.

25 Claims, 8 Drawing Sheets

MESSAGES ASSOCIATED WITH UNOPENED DELIVERED PACKAGES

BACKGROUND

With the increased popularity of electronic commerce and online shopping, many people receive more packages through carrier mail or delivery services than when these people purchased items primarily from physical locations of retailers. Most delivered packages arrive to a destination days after a purchase. The packages are typically generic brown boxes or envelopes that often provide little or no indication of the contents of the package. Sometimes this is by design for purposes such as to avoid solicitation that may result in theft of the package, for privacy reasons, for cost reasons, or for other reasons. However, some recipients may desire to know some information about the contents of a package prior to opening the package.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed at least in part to providing coded messages associated with unopened delivered packages. The coded messages may help recipients determine information about the contents of packages without opening the packages, and thereby help prevent spoiling surprises (e.g., holiday gifts, etc.) or otherwise preventing other unwanted behavior.

In accordance with one or more embodiments, the messages may be decrypted or otherwise received by an authorized recipient of the package. For example, the message may be coded or otherwise associated with an image on the package that the recipient can scan and then decrypt using a token or key stored in an electronic device (e.g., a mobile telephone, etc.). The recipient may receive the token or key after providing credentials that identify the recipient (e.g., login and password, etc.), by electronic messaging (receive an electronic message from the sender that includes the token, etc.), or by other techniques. In some instances, the code or image on the package may be a token or key that enables the recipient to obtain a message from a remote service after providing additional authentication information that proves the identity of the recipient.

In some embodiments, the message may be unique for each potential recipient, such as when a household or address has multiple possible recipients. For example, if a husband purchases a gift for his wife, the husband may create a first message for receipt by the wife (if she receives the package) that asks her to not open the box and a second message for receipt by the husband (if he receives the package) that reminds him of the contents of the package.

The techniques and systems described herein may be implemented in a number of ways. Example implementations are provided below with reference to the following figures.

Illustrative Environment

Figure 1:
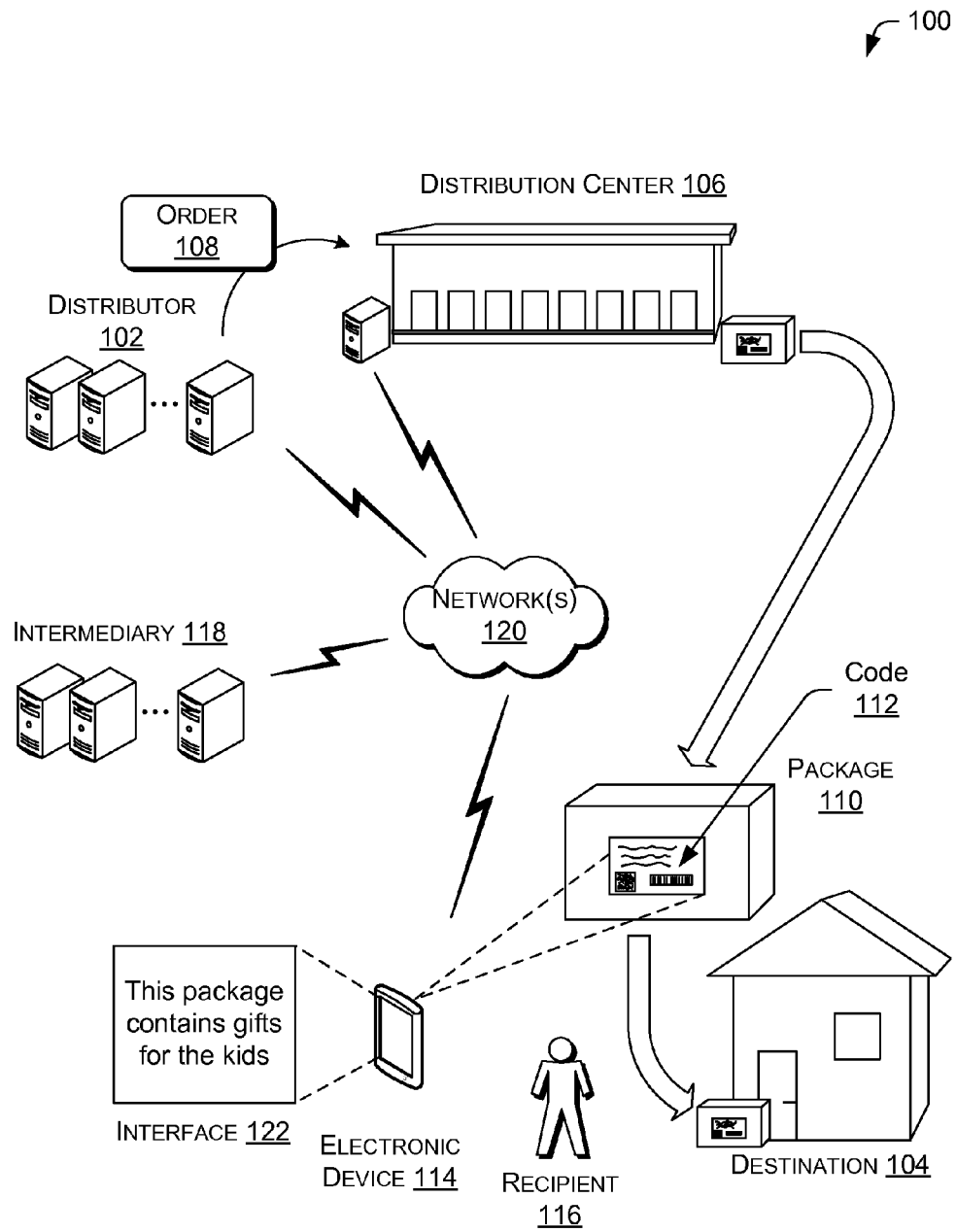
FIG. 1 is a schematic diagram of an illustrative environment to create and reveal messages associated with unopened delivered packages.

FIG. 1 is a schematic diagram of an illustrative environment 100 to create and reveal messages associated with unopened delivered packages. The environment 100 includes a distributor 102 that may be a merchant, a host of an electronic marketplace, or any other entity that may receive a request for an item to be delivered to a destination 104. The distributor 102 may process sales or other acquisitions of items to be delivered to the destination 104. For example, the distributor 102 may receive an order of items that is to be shipped to a residential address. In some instances, the distributor 102 may include a distribution center 106, which may be a separate location and possibly a separate entity. For example, when the distributor 102 is a large retailer, the distributor may process transactions and then send an order 108 to the distribution center 106 for order fulfillment. The distribution center 106 may then obtain the items in the order 108, package the items into a package 110, and then initiate shipment of the package 110 through a delivery service, common courier, etc. The distribution center 106 may place items in the package, which may be a generic box and/or envelop that does not reveal the contents of the box/envelop. In some instances, when the distributor 102 is a small retailer, the distribution center 106 may be combined with the distributor such as when a small retailer ships items directly from their store or order processing location.

The distributor 102 or the distribution center 106 may create a code 112 for inclusion with the package 110. The code 112 may be contained in an image which may be included on a packing label of the package 110, such as a barcode or a quick response (QR) code. The code 112 may be stored in a radio frequency identifier (RFID) tag, which may be placed inside the package and/or otherwise provided with the package and capable of receipt by a recipient (via an electronic device) without opening the package.

In accordance with one or more embodiments, the code may contain an encrypted message that can be read by an electronic device 114 associated with a recipient 116. For example, the recipient 116 may have a token or obtain a token that can enable the electronic device 114 (or another device) to decrypt the message. As discussed herein, the token include any data or object used to decrypt data that is encrypted. The term "token" may be used interchangeably with the term "key" or other terms of art used in encryption/decryption. The recipient 116 may receive the token, that when used with the code 112 may enable access to the message. In some instances, the recipient 116 may receive the token via an electronic message (pushed message) or may request the token after providing authentication information (e.g., user credentials, use of a registered telephone number, etc.).

In various embodiments, the code 112 may be a token that enables the recipient 116 to obtain the message from the distributor 102, the distribution center 106, and/or an intermediary 118. In some embodiments, the intermediary 118 may provide a service that manages creation of the messages on behalf of the distributor 102 and/or the distribution center 106, such as when the messages are provided as a service to the distributor 102 and/or the distribution center 106. When the code 112 is the token, the recipient 116 may use the electronic device 114 to transmit the code 112 and at least some identification information to the distributor 102, the distribution center 106, and/or the intermediary 118 via a network 120. The network 120 may be any type of wired and/or wireless network that enables message transmission between different communication devices, such as the electronic device 114 (e.g., mobile telephones, computers, tablets, gaming devices, electronic book readers, etc.), servers, and/or other communication devices. In response, the distributor 102, the distribution center 106, and/or the intermediary 118 may transmit a message back to the recipient 116 via the electronic device 114. The message may include information about contents of the package. Thus, the recipient 116 may discover information about the contents of the package 110 using the code 112 and without opening the package. This may prevent the recipient 116 from spoiling a surprise and/or may provide other beneficial information to the recipient without sacrificing privacy information to other people who do not have the identification information.

In some embodiments, the electronic device 114 may present an interface 122 that enables the recipient to obtain the code 112, receive a token, and/or read the message. The interface 122 may enable control of an application designed at least partially for purposes of reading the code 112 and accessing or decrypting a message for view by the recipient 116.

Illustrative Computing Architecture

Figure 2A:
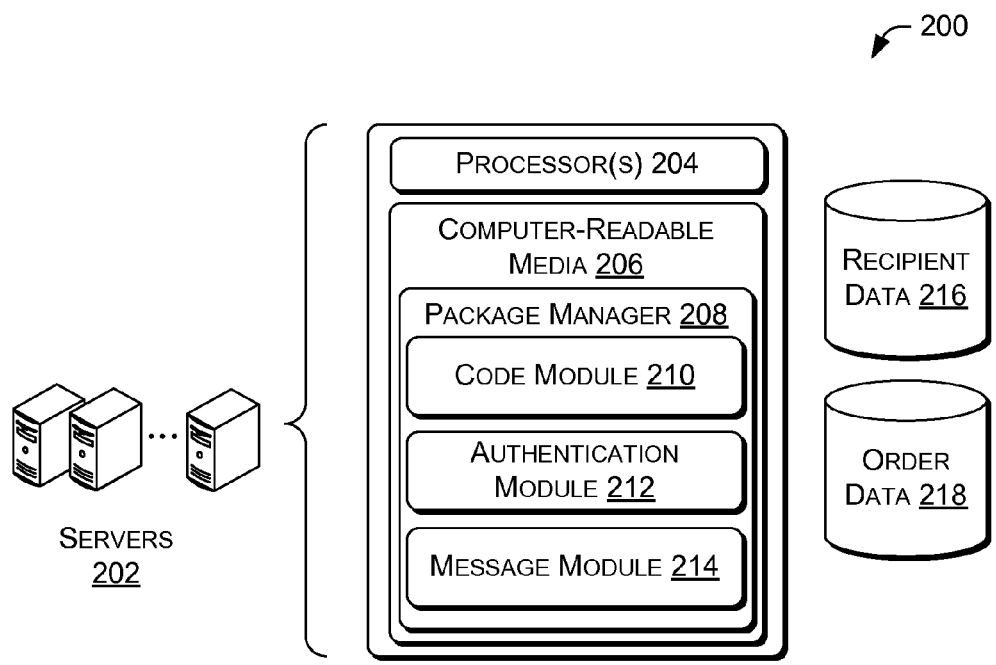
FIGS. 2A and 2B are schematic diagrams of illustrative computing architecture that perform operations to provide messages associated with unopened delivered packages.
Figure 2B:
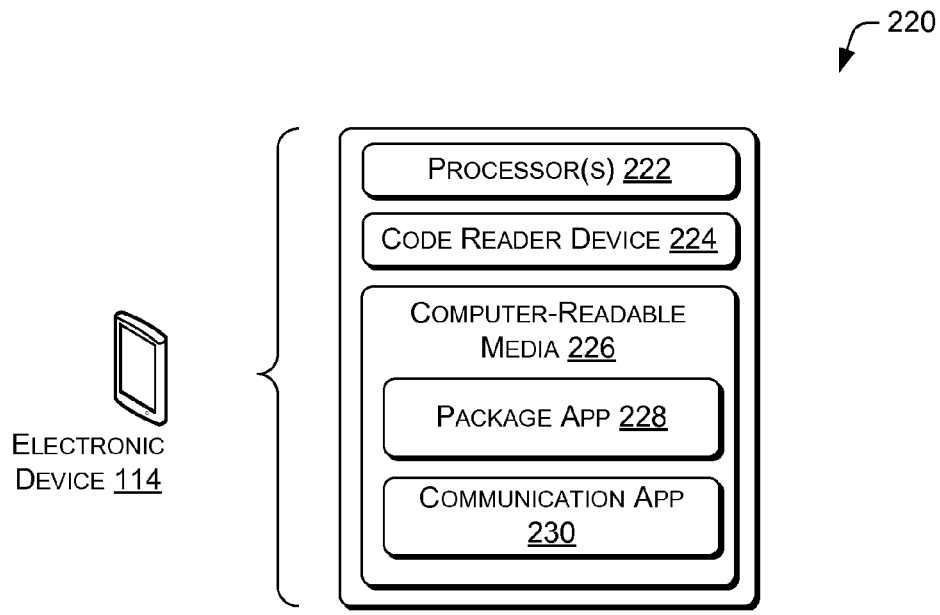

FIGS. 2A and 2B are schematic diagrams of illustrative computing architecture that perform operations to provide messages associated with unopened delivered packages. The FIGS. 2A and 2B are described with reference to the environment 100.

FIG. 2A shows an illustrative computing architecture 200 that may include servers 202. The computing architecture 200 may be implemented in a distributed or non-distributed computing environment. The servers 202 may be servers of the distributor 102, the distribution center 106, and/or the intermediary 118.

In servers 202 may include one or more processors 204 and one or more computer readable media 206 that stores various modules, applications, programs, or other data. The computer-readable media 206 may include instructions that, when executed by the one or more processors 204, cause the processors to perform the operations described herein for a package manager 208.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 206 may store the package manager 208. The package manager 208 may include various modules, which may include a code module 210, an authentication module 212, and a message module 214, each described in turn. The modules may be stored together or in a distributed arrangement.

The code module 210 may create or generate the code 112 that is included with the package 110. The code 112 may be stored as an image, such as a barcode or a QR code and/or provided by printed symbols (e.g., an alphanumeric code, etc.). For example, the code 112 may be printed in a mailing label for the package 110. In some embodiments, the code 112 may be stored in an RFID tag or other communication media that is accessible without opening the package 110. As discussed above, the code 112 may be an encrypted message or may be a token that enables an authorized recipient to access a message. In various embodiments, the code 112 may be a same number or identifier used by the distributor 102, the distribution center 106, or another party for product identification (e.g., a mailing barcode, etc.)

The authentication module 212 may authenticate the recipient 116 that wants to access a message associated with the package 110. In some embodiments, the authentication module 212 may create a token that allows a recipient in possession of the token to decrypt the code (using the electronic device 114) and read the message. The token may then be transmitted to the recipient(s) that may receive the package for use when the package arrives. In these instances, the code module 210 may use the token to encrypt the message when creating the code 112.

In various embodiments, the authentication module 212 may be used to verify an identity of the recipient 116. For example, the recipient 116 may provide information to the authentication module 212 that positively identifies the recipient using recipient data 216, such as by providing user credentials, calling from a registered telephone number linked to the recipient, and so forth. The recipient data 216 may be stored data associated with the recipient 116. The recipient 116 may also provide the code 112, which when combined with a successful authentication by the authentication module 212, may direct the package manager 208 to provide a message to the recipient 116.

The message module 214 may create one or more messages for the association with package 110. In some instances, the message 214 may include information based at least in part on order data 218 related to the order 108 of items included in the package. The message module 214 may create default messages to provide information about the package, such as those shown in FIG. 5. In some embodiments, the message module 214 may enable a purchaser (person who initiates the order 108 of the items) to create custom message(s). The messaging module 214 may maintain messages for different recipients for each package. Thus, a single package may include multiple different messages, each associated with a different possible recipient of the package 110.

For example, a mother may purchase some gifts for her children from an online company that delivers the gifts by mail. The mother may select a message that is associated with her information and a father's information, which may be stored in the recipient data 216. When the package arrives at the destination 104, the mother or father may retrieve the message without opening the package while the message may be unreadable by others, such as a delivery person or neighbor.

FIG. 2B shows an illustrative computing architecture 220 that may be representative of the electronic device 114. The computing architecture 220 may include one or more processors 222, a code reader device 224, and one or more computer readable media 226 that stores various modules, applications, programs, or other data. The computer-readable media 226 may be include instructions that, when executed by the one or more processors 222, cause the processors to perform the operations described herein for the electronic device 114. Like the computer-readable media 206, the computer-readable media 226 may include a non-transitory machine-readable storage medium and/or a transitory machine-readable signal. The code reader device 224 may be any device hardware capable or useable to read the code 112, such as without limitation, a camera, an optical scanner, an RFID reader, or other type of input device.

In accordance with various embodiments, the computer-readable media 226 may include a package application 228 and a communication application 230. The package application 228 may initially be used to read the code 112 using the code reader device 224. When the code 112 is an encrypted message, the package application 228 may be used to decrypt the code using a token received by the communication application 230. When the code 112 is a token, the package application 228 may communicate the code 112 to the authentication module 212 to enable receipt of the message. For example, the code 112 may be scanned by a mobile telephone with a known identification number or telephone number that is associated with the recipient 116 via the recipient data 216, and transmitted to the authentication module 212. In some embodiments, the recipient 116 may provide user credentials along with the code 112 using the package application 228.

The communication module 230 may receive the token when the token is transmitted to the electronic device 114. In some instances, the package application may 228 receive the token without user input when the token is received by the communication module 230. Thus, when the token is present (stored by the electronic device 114) and the recipient 116 reads the code 112 with the electronic device, the message may be automatically decrypted and revealed to the user assuming the token is a correct token associated with the code. The communication module 230 may also operate to facilitate exchanges of data with the servers 202 when the code 112 is a token. Thus, the package application 228 may interact with the communication application 230 to exchange data with the package manager 208. The communication module 230 may utilize any practical communication technique to facilitate an exchange of data, such as through email protocols, short message service (SMS) text messaging, instant messaging, and so forth.

Further operation of the package manager 208 executed by the servers 202 and the package application 228 and the communication application 230 executed by the electronic device 114 are described with reference to the following figures.

Illustrative Operation

FIGS. 3, 4, and 6-8 are flow diagrams of illustrative processes to create and/or read messages associated with unopened delivered packages. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to the environment 100. Of course, the processes may be performed in other similar and/or different environments.

Figure 3:
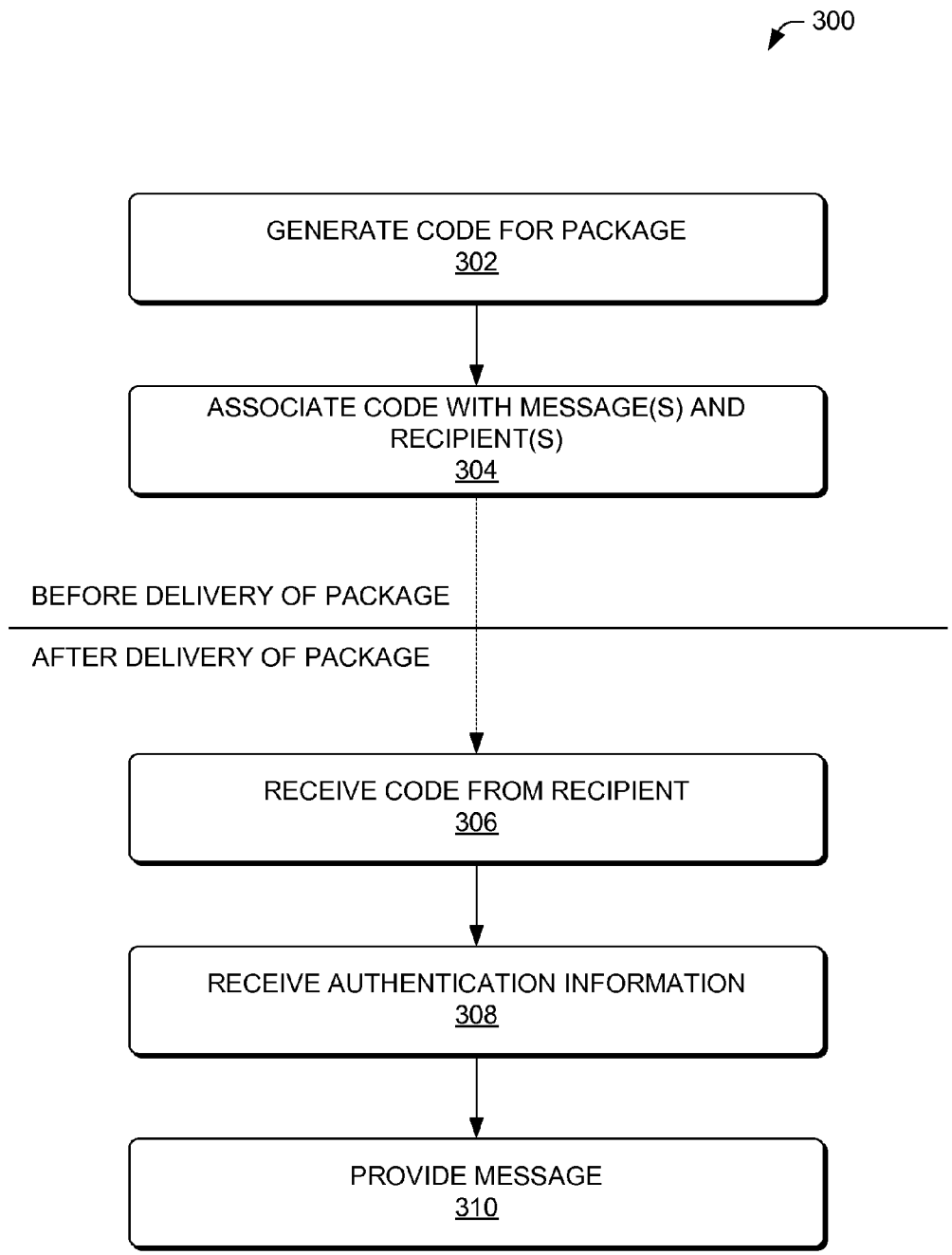
FIG. 3 is a flow diagram of an illustrative process to create and redeem messages associated with an unopened package.

FIG. 3 is a flow diagram of an illustrative process 300 to create and redeem messages associated with an unopened package. The process 300 may be performed by the servers 202 and may be performed by any one or more of the distributor 102, the distribution center 106, and/or the intermediary 118. In the process 400, the code 112 is a token used to retrieve a message from the servers 202.

Operations 302 and 304 may be performed prior to delivery of the package 110. At 302, the code module 210 may generate a code (e.g., the code 112) for the package 110. In some embodiments, the code 112 may be a token assessable by the authentication module 212.

At 304, the code module 210 may associate the code 112 with message(s) and recipient(s). For example the code 112 may be associated a single message that provides generic information about the order 108. However, in some instances, the code 112 may be associated with multiple messages, where each message is directed to a possible recipient of the package.

Operations 306, 308, and 310 may occur after the package 110 has been delivered to a destination 104 and prior to opening of the package. At 306, the authentication module 212 may receive the code 112 from the electronic device 114 of the recipient 116. The code 112 may be scanned, read, or otherwise extracted from the package 110 without opening the package.

At 308, the authentication module 212 may receive authentication information from the electronic device 114. The authentication information may be provided by inputs from the recipient 116 (e.g., user credentials, etc.) and/or by data associated with the electronic device (e.g., device identifier, etc.).

At 310, the messaging module 214 may provide a message to the electronic device 114 for presentation to the recipient 116. The message may be specific for the package 110 containing the code 112, and possibly specific to the recipient 116 providing the authentication data to the authentication module 212.

In some instances, the order 108 may be shipped in multiple packages. In accordance with one or more embodiments, the messages associated with a package may include information about the existence, shipping or transit status, or other information about related packages. For example, a first package may arrive at the destination 104. The message module 214 may update the message associated with the first package to include an indication of a second package and a tracking number associated with the second package, for example. The message may also include information about the contents of the second package and/or other relevant information. The message module 214 may update the message to include actual shipping information using the tracking number, such as to indicate the estimated arrival date and/or current location of the second package to the recipient 116. Thus, the message module may update the message one or more times during transit of the first package and/or the second package to provide current information to the recipient.

Figure 4:
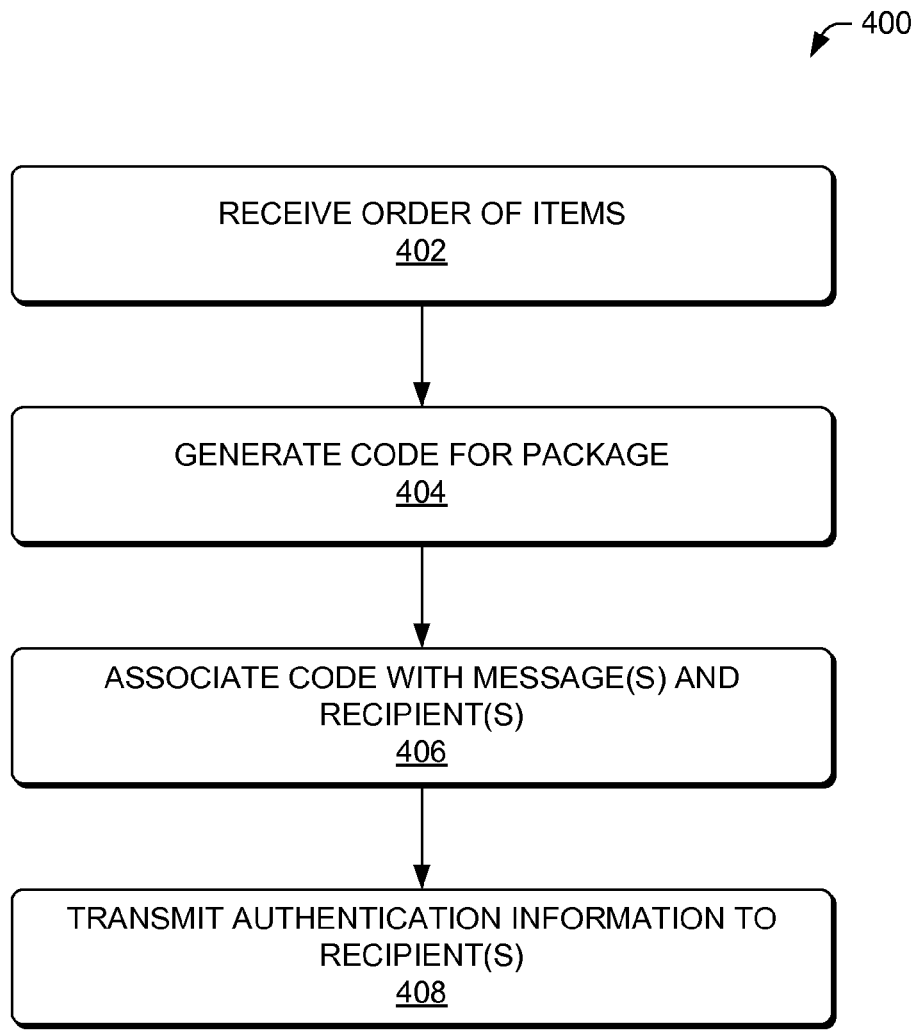
FIG. 4 is a flow diagram of an illustrative process to transmit authentication information to a recipient to enable redeeming a message associated with an unopened package.

FIG. 4 is a flow diagram of an illustrative process 400 to transmit authentication information to a recipient to enable redeeming a message associated with an unopened package. The process 400 may be performed by the servers 202 and may be performed by any one or more of the distributor 102, the distribution center 106, and/or the intermediary 118. In the process 400, the code 112 may be an encrypted message. However, the code 112 may be a token in the process 400. The process 400 describes operations that occur prior to delivery of the package to the destination 104.

At 402, the package manager 208 may receive the order 108 of items from a buyer (who may or may not be the recipient 116).

At 404, the code module 210 may generate a code (e.g., the code 112) for the package 110. In some embodiments, the code 112 may be encrypted using a token assessable by the authentication module 212.

At 406, the code module 210 may associate the code 112 with message(s) and recipient(s).

At 408, the authentication module 212 may transmit authentication information to one or more possible recipients of the package. The authentication information may be a token that can be used to decrypt the code 112 when the code is read by an electronic device (e.g., the electronic device 114) executing an application to perform decryption of the code (e.g., the package application 228).

Figure 5:
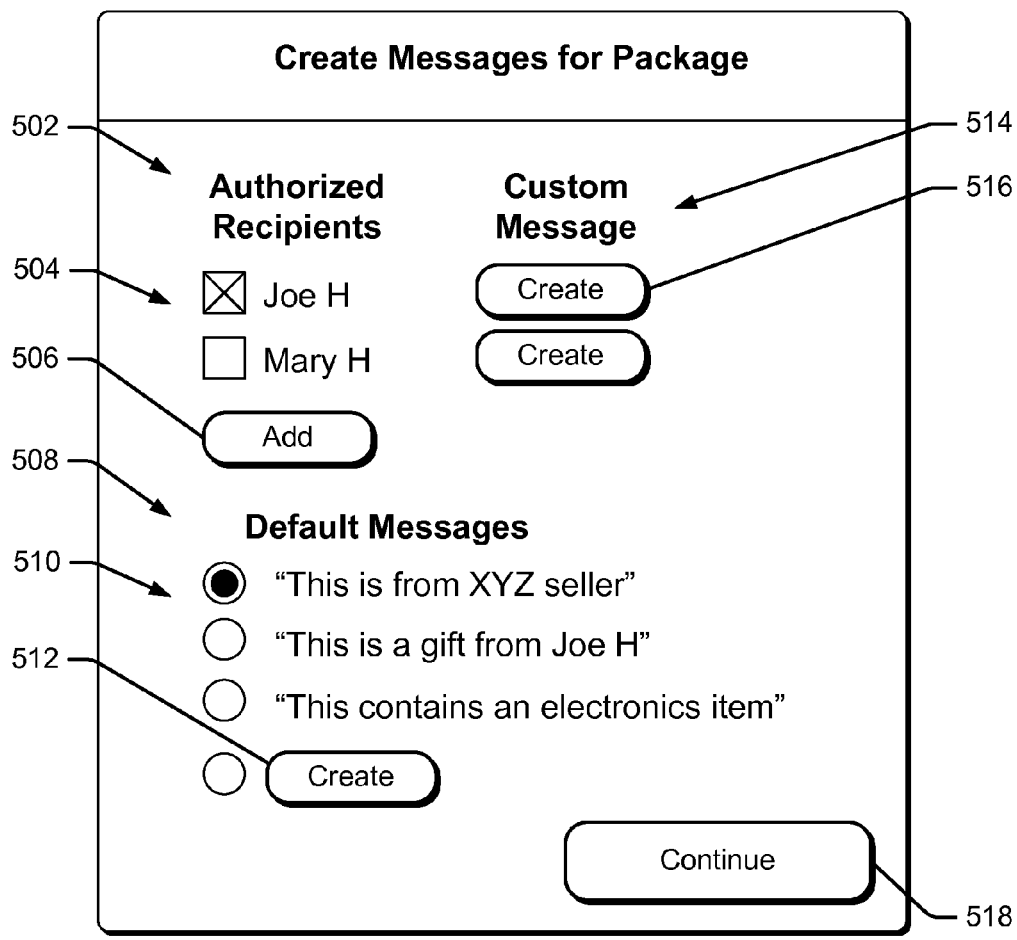
FIG. 5 is an illustrative user interface (UI) that enables a user to create messages for recipients of an unopened package.

FIG. 5 is an illustrative user interface (UI) 500 that enables a user to create messages for recipients of a package. The UI 500 may be presented to a customer prior to completing the order 108.

The UI 500 may include an authorized recipients section 502 that enables the customer to select authorized recipients. In some embodiments, the package manager 208 may include suggested authorized recipients 504, which may include the customer and other people that are associated with a shipping address (e.g., stored in the recipient data 216, etc.) and so forth. The authorized recipients section 502 may also include an add command 506 to allow the customer to add authorized recipients, which may be saved in the recipient data 216. In some embodiments, the authorized recipients section 502 may enable selection of delivery methods of a token (e.g., who to send a token to that enables decryption of the code", password selection, etc.). When the authorized recipients have accounts with the distributor (or other party associated with the package manager 208), then the authorized recipients may use the credentials for those accounts to access the messages.

The UI 500 may include a default messages section 508 that enables a customer to select a default message that is presented to any one of the authorized recipients after the authorized recipient provides a token and authentication information as discussed above. In various embodiments, the message module 214 may create sample messages 510 based on information from the order data 218. The sample messages 510 may be generated using generic information about the order, such as to include a name of the seller, a status as a gift, a category of the gift, and/or other information. The default messages section 508 may also include a create command 512 to enable a customer to create a default message. The default messages are sent by the message module 214 to recipients that are not associated with a custom message, as described below.

The UI 500 may include a custom message section 514 to enable the customer to create customer messages for any of the authorized recipients using creation commands 516. For example, a customer named "Joe H" may create a custom message for himself that reminds him of the contents of the package, such as "Bracelet for Mary." The customer may create a message for his wife, "Mary H", which asks her not to open the package, such as "Darling, please do not open this package without me!" When authorized recipients do not have a custom message, they may receive the default message. A continue command 518 may be used to accept the selections in the UI 500.

Figure 6:
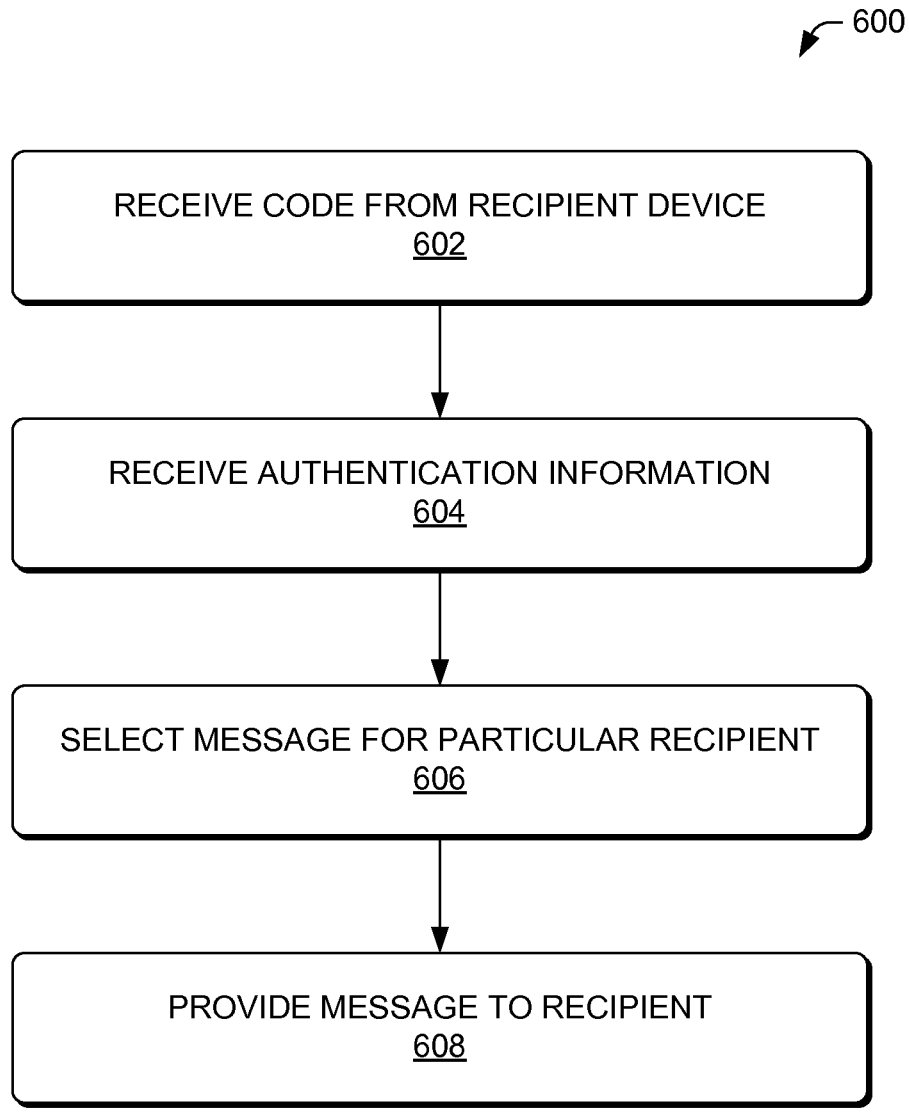
FIG. 6 is a flow diagram of an illustrative process to deliver a personalized message to a recipient of a package.

FIG. 6 is a flow diagram of an illustrative process 600 to deliver a personalized message to a recipient of a package. The process 600 may be performed by the servers 202 and may be performed by any one or more of the distributor 102, the distribution center 106, and/or the intermediary 118. The process 600 may be performed after the customer interacts with the UI 500.

At 602, the code module 210 may receive the code 112 from the electronic device 114 of the recipient 116.

At 604, the authentication module 212 may receive authentication information from the recipient 116. The authentication information may be a token transmitted to the recipient 116 (e.g., via the process 400), credentials of the recipient (e.g., username/password for an account), a known telephone number or device identifier associated with the electronic device 114 in communication with the authentication module 212, and/or other data that positively identifies the recipient 116.

At 606, the message module 214 may select a message for a particular recipient based at least in part on the authorization information from the operation 604 and/or input from the UI 500 as discussed above. For example, when the customer generates a custom message for the recipient 116, the message module 214 will select the custom message at 606. Otherwise, the message module 214 may select the default message.

At 608, the message module 214 may provide the message to the recipient. The message may be provided by any practical communication type, such as through the communication application 230.

Figure 7:
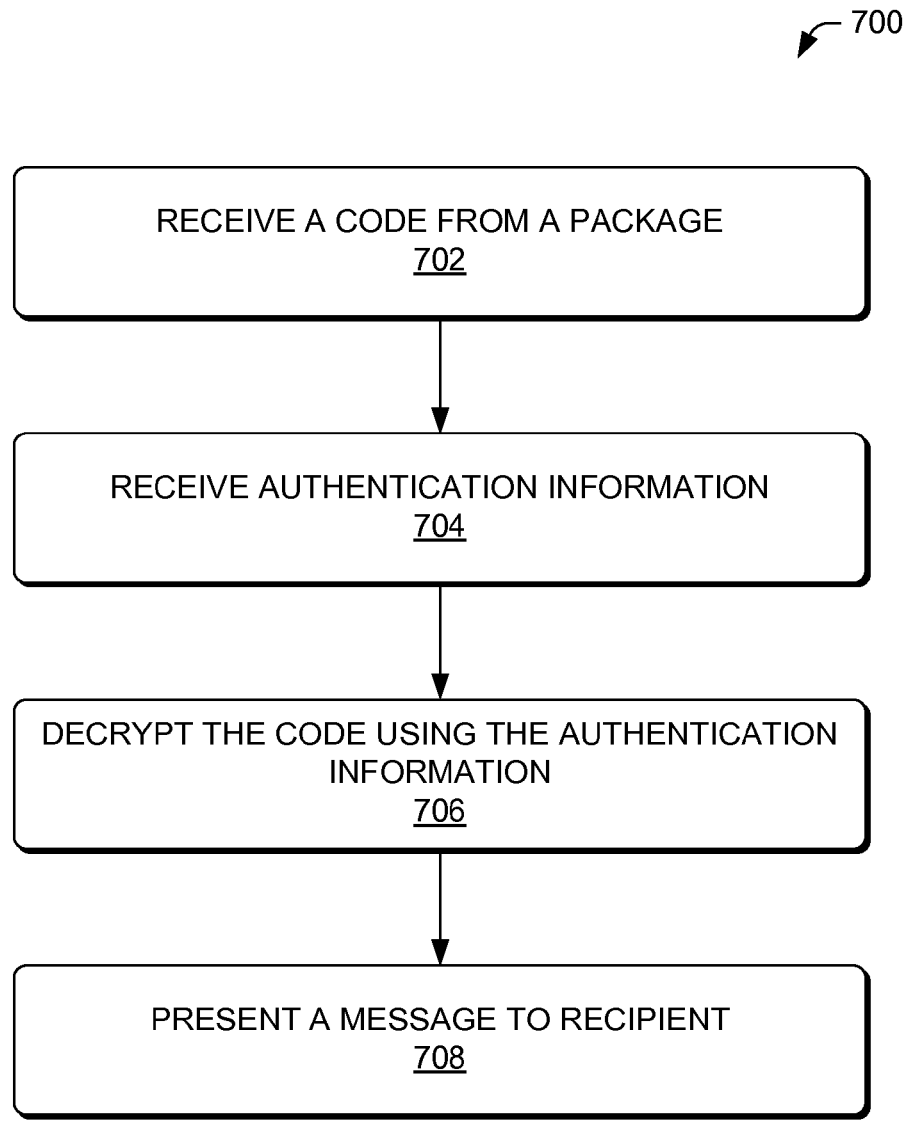
FIG. 7 is a flow diagram of an illustrative process to decrypt a code to obtain a message associated with an unopened package.

FIG. 7 is a flow diagram of an illustrative process 700 to decrypt a code to obtain a message associated with an unopened package. The process 700 may be performed by the electronic device 114 under control of the recipient 116.

At 702, the package application 228 may receive the code 112 from the package 110. For example, the package application 228 may activate the code reader device 224 to obtain the code 112 from the package 110.

At 704, the package application 228 may receive the authentication information. In some instances, the authentication information may be a token received by the communication application 230 (e.g., via email, SMS, direct to application, etc.). However, the authentication information may be user credentials or other identifying information about the recipient that enables access to the token, which may be stored remotely and/or by in the electronic device 114.

At 706, the package application 228 may decrypt the code 112 using the authentication information or data retrieved from the authentication information (e.g., the token).

At 708, the package application 228 may present the message to the recipient via the electronic device 114.

Figure 8:
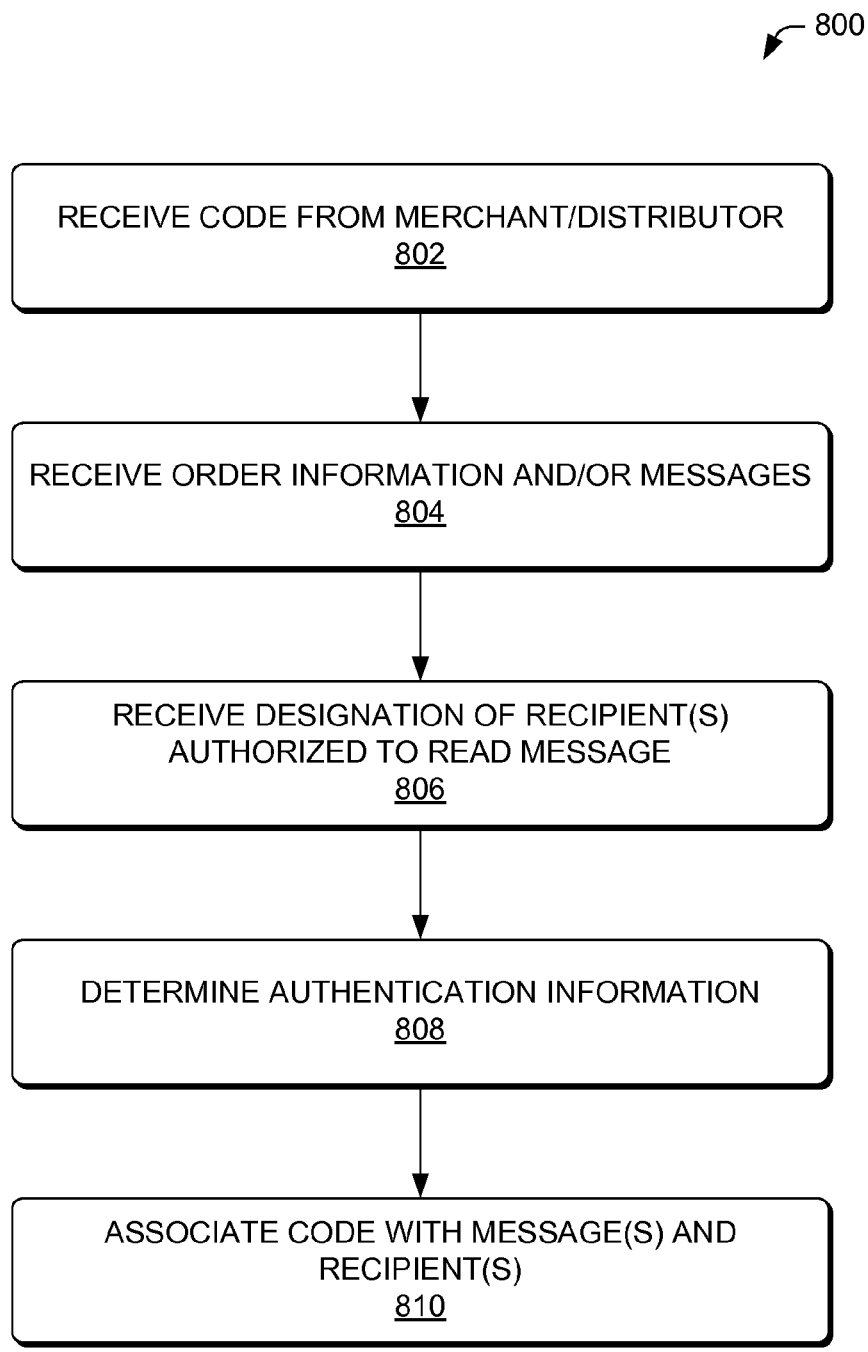
FIG. 8 is a flow diagram of an illustrative process to create coded messages on behalf of a seller that provides items in packages for recipients.

FIG. 8 is a flow diagram of an illustrative process 800 to create coded messages on behalf of a seller that provides items in packages for a recipient. The process 800 may be performed by the servers 202 and may be performed by the intermediary 118. For example, the process 800 may be implemented as a service provided by the intermediary 118 on behalf of the distributor 102 and/or the distribution center 106.

At 802, the intermediary 118 may receive the code 112 from the sender (e.g., the distributor 102 and/or the distribution center 106). For example, the intermediary 118 may receive an alphanumeric number used in the code 112, which is also displayed on the packages as an image (e.g., barcode, QR code, etc.), or stored in an RFID tag in the package.

At 804, the intermediary 118 may receive order information and/or messages for recipients of the package 110. The order information and/or messages may be provided by the distributor 102 that creates the order 108 for the customer.

At 806, the intermediary 118 may receive a designation of recipient(s) authorized to read a message. The recipients may include the customer that purchased the items in the package, people designated by the customer as possible recipients, or other people.

At 808, the intermediary 118 may receive information about the recipients that may be used by the authentication module 212 (e.g., messaging addresses, device identifier, etc.).

At 810, the intermediary 118 may associate the code 112 with the message(s) and recipient(s). In this way, the intermediary 118 may provide the messages associated with unopened delivered packages on behalf of the distributor 102 and/or the distribution center 106. This may be particularly useful when the distributor 102 is a small business and does not have infrastructure to support providing the messages.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    under control of one or more servers configured with executable instructions,
        generating a first code and a second code for a package, the codes being accessible by an electronic device without opening the package;
        associating the first code with a first message and a recipient, the first message providing information associated with the package;
        associating the second code with a second message, the second message providing information associated with the package;
        after delivery of the package to a destination, receiving one of the codes from the electronic device;
        in response to receiving the first code:
            receiving authentication information from the recipient that positively identifies the recipient as being associated with the first code; and
            transmitting the first message to the electronic device in response to the received authentication information being associated with the first code; and
        in response to receiving the second code, transmitting the second message to the electronic device.

2. The method as recited in claim 1, wherein individual ones of the codes are included in at least one of a barcode, a quick response (QR) code, or a radio frequency identifier (RFID) tag that is readable by the electronic device without opening the package.

3. The method as recited in claim 1, wherein the authentication information that positively identifies the recipient includes at least one of a device identifier associated with the recipient or user credentials associated with the recipient.

4. The method as recited in claim 1, wherein the codes are unique tokens associated with the package.

5. The method as recited in claim 1, wherein the recipient is a first recipient, further comprising:
    associating the second code with a second recipient; and
    in response to receiving the second code:
        receiving authentication information from the second recipient that positively identifies the second recipient as being associated with the second code,
    wherein the transmitting the second message transmits the second message in response to the received authentication information from the second recipient associated with the second code,
    wherein the first and second recipients are associated with the same destination and the first message is different than the second message.

6. A method, comprising:
    generating a first code and a second code for a package, the codes being messages that are encrypted and provide information associated the package, the first and second codes being accessible without opening the package; and
    transmitting a first of at least two tokens to a first recipient and a second of the at least two tokens to a second recipient prior to delivery of the package to a destination, the first token being usable by an electronic device to decrypt the first code to reveal the associated message after the first code is read by the electronic device, the second token being usable by the electronic device to decrypt the second code to reveal the associated message after the second code is read by the electronic device.

7. The method as recited in claim 6, further comprising creating the messages based at least in part on information about items in the package.

8. The method as recited in claim 6, further comprising creating the messages in response to input from a customer that purchased items included in the package.

9. The method as recited in claim 6, further comprising encrypting the messages.

10. The method as recited in claim 6, wherein individual ones of the codes are included in at least one of a barcode, a quick response (QR) code, or a radio frequency identifier (RFID) tag that is readable by the electronic device without opening the package.

11. A method, comprising:
    accessing, by an electronic device, one of at least two codes associated with a package, the codes being associated with different messages that are encrypted and provide information associated the package, the codes being accessible without opening the package;
    receiving, by the electronic device, one of at least two tokens prior to delivery of the package to a destination;
    decrypting one of the codes using a first one of the received tokens, by the electronic device, to obtain an associated one of the different messages; and
    outputting the associated one of the different messages.

12. The method as recited in claim 11, wherein the receiving the one of at least two tokens includes receiving the one of at least two tokens by at least one of an email message or a text message.

13. The method as recited in claim 11, wherein the accessing the one of at least two codes includes at least one of obtaining the one of at least two codes with an optical reader device or receiving data from a radio frequency identifier (RFID) tag.

14. The method as recited in claim 11, wherein the outputting the associated one of the different messages includes causing the associated one of the different messages to be displayed on a display of the electronic device.

15. One or more non-transitory computer-readable media storing computer-executable instructions that, when executed on one or more processors, performs acts comprising:
- associating a first code from a package with a first message and a recipient;
- associating a second code from the package with a second message, the first message and the second message providing information associated the package, the first code and the second code being accessible without opening the package;
- after shipment of the package, receiving a request to redeem at least one of the first code or the second code from an electronic device;
- in response to receiving the first code:
   - receiving authentication information from the recipient that positively identifies the recipient as being associated with the first code; and
   - transmitting the first message to the electronic device in response to the received authentication information being associated with the first code; and
- in response to receiving the second code, transmitting the second message to the electronic device.

16. The one or more non-transitory computer-readable media as recited in claim 15, wherein the first code and the second code are unique tokens associated with the package.

17. The one or more non-transitory computer-readable media as recited in claim 15, wherein the receiving the authentication information includes at least one of receiving an identifier from the electronic device that identifies the recipient or receiving credentials from the recipient to identify the recipient.

18. The one or more non-transitory computer-readable media as recited in claim 15, wherein the recipient is a first recipient, and
- further comprising associating the second code with a second recipient.

19. The one or more non-transitory computer-readable media as recited in claim 18, wherein the first recipient and the second recipient are associated with the destination and the first message is different than the second message.

20. The one or more non-transitory computer-readable media as recited in claim 15, wherein the package is a first package, and wherein at least one of the first message or the second message includes an indication of a second package that is related to the first package.

21. The one or more non-transitory computer-readable media as recited in claim 20, wherein the acts further comprise updating the first message or the second message to include at least one of an estimated arrival date or a current location of the second package.

22. A system comprising:
- one or more servers configured to,
   - generate a first code and a second code for a package, the codes being accessible by an electronic device without opening the package;
   - associate the first code with a first message and a recipient, the first message providing information associated with the package;
   - associate the second code with a second message, the second message providing information associated with the package;
   - after delivery of the package to a destination, receive one of the codes from the electronic device;
   - in response to receiving the first code:
      - receive authentication information from the recipient that positively identifies the recipient as being associated with the first code; and
      - transmit the first message to the electronic device in response to the received authentication information being associated with the first code; and
   - in response to receiving the second code, transmit the second message to the electronic device.

23. The system as recited in claim 22, wherein the recipient is a first recipient and in response to receiving the second code, the one or more servers are further configured to:
- associate the second code with a second recipient; and
- in response to receiving the second code:
   - receive authentication information from the second recipient that positively identifies the second recipient as being associated with the second code,
- wherein the transmission of the second message is based on the received authentication information from the second recipient associated with the second code,
- wherein the first and second recipients are associated with the same destination and the first message is different than the second message.

24. The system as recited in claim 22, wherein individual ones of the codes are included in at least one of a barcode, a quick response (QR) code, or a radio frequency identifier (RFID) tag that is readable by the electronic device without opening the package.

25. The system as recited in claim 22, wherein the authentication information that positively identifies the recipient includes at least one of a device identifier associated with the recipient or user credentials associated with the recipient.

* * * * *